United States Patent
Chen et al.

(10) Patent No.: US 11,755,092 B1
(45) Date of Patent: Sep. 12, 2023

(54) POWER SAVING SYSTEM OF BATTERY CHARGER

(71) Applicant: ANPEC ELECTRONICS CORPORATION, Hsinchu (TW)

(72) Inventors: Chih-Ning Chen, Taipei (TW); Chih-Heng Su, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 17/833,821

(22) Filed: Jun. 6, 2022

(30) Foreign Application Priority Data

Mar. 17, 2022 (TW) .................................. 111109746

(51) Int. Cl.
*G06F 1/3212* (2019.01)
*G06F 1/3287* (2019.01)

(52) U.S. Cl.
CPC .......... *G06F 1/3212* (2013.01); *G06F 1/3287* (2013.01)

(58) Field of Classification Search
CPC ..... G06F 1/3212; G06F 1/3287; G06F 1/3203
See application file for complete search history.

(56) References Cited

U.S. PATENT DOCUMENTS

| | | | | |
|---|---|---|---|---|
| 2010/0194348 | A1* | 8/2010 | Wang | H01M 10/48 320/136 |
| 2010/0332868 | A1* | 12/2010 | Tan | G06F 1/3206 713/310 |
| 2013/0042130 | A1* | 2/2013 | Li | H02J 7/007184 713/323 |
| 2017/0098939 | A1* | 4/2017 | Tsai | H02J 7/0068 |
| 2019/0146574 | A1* | 5/2019 | Jung | H04B 1/1615 713/323 |
| 2019/0181667 | A1* | 6/2019 | Yu | H01M 10/425 |

* cited by examiner

*Primary Examiner* — Jaweed A Abbaszadeh
*Assistant Examiner* — Gayathri Sampath
(74) *Attorney, Agent, or Firm* — Li & Cai Intellectual Property Office (57) ABSTRACT

A power saving system of a battery charger is provided. A control terminal of a first transistor receives a wake-up signal. A counter is connected to a first terminal of the first transistor. The counter determines whether or not a working period of the wake-up signal from the first transistor is larger than a time threshold to output a counting signal. When the counting signal indicates that the working period of the wake-up signal is not larger than the time threshold, the counter and electronic components of an electronic device are turned off, thereby saving power of a battery. When the counting signal indicates that the working period of the wake-up signal is larger than the time threshold, the electronic device is switched from a power saving mode to a normal operation mode. In the normal operation mode, the battery can supply power to the electronic device.

15 Claims, 5 Drawing Sheets

POWER SAVING SYSTEM OF BATTERY CHARGER

CROSS-REFERENCE TO RELATED PATENT APPLICATION

This application claims the benefit of priority to Taiwan Patent Application No. 111109746, filed on Mar. 17, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a battery charger, and more particularly to a power saving system of a battery charger.

BACKGROUND OF THE DISCLOSURE

With the rapid development of electronic technology, various electronic products such as mobile phones, desktop computers and notebook computers are widely used in people's daily lives. Rechargeable batteries are used as power sources for many of the electronic products. When there is insufficient power for the electronic product to operate, the rechargeable battery can provide power to the electronic product. However, since the electronic product is not used when being transported (e.g., by ship), if the battery continues to supply power to the electronic product during this time, unnecessary power consumption will be the resulting consequence.

SUMMARY OF THE DISCLOSURE

In response to the above-referenced technical inadequacies, the present disclosure provides a power saving system of a battery charger. The power saving system includes a first transistor, a second transistor, a counter and an operation management circuit. A control terminal of the first transistor is connected to an external power circuit and receives a wake-up signal from the external power circuit. A first terminal of the first transistor is coupled to an input voltage. A first terminal and a control terminal of the second transistor are connected to a second terminal of the first transistor. A second terminal of the second transistor is grounded. A trigger terminal of the counter is connected to the first terminal of the first transistor. When the counter receives the wake-up signal and woken up by the wake-up signal in a power saving mode, the counter determines whether or not a working period of the wake-up signal is larger than a time threshold to output a counting signal. The operation management circuit is connected to the counter and an electronic device. The electronic device is coupled to a battery. The operation management circuit is configured to receive the counting signal from the counter. When the counting signal received by the operation management circuit in the power saving mode indicates that the working period of the wake-up signal is not larger than the time threshold, the operation management circuit turns off the counter and a plurality of electronic components included in the electronic device. When the counting signal received by the operation management circuit in the power saving mode indicates that the working period of the wake-up signal is larger than the time threshold, the operation management circuit determines whether or not the battery is switched from the power saving mode to a normal operation mode, and triggers the electronic device to be turned on and to receive power from the external power circuit or the battery.

In certain embodiments, the power saving system further includes a first resistor. A first terminal of the first resistor is connected to the control terminal of the first transistor. A second terminal of the first resistor is grounded.

In certain embodiments, the power saving system further includes a current source. A first terminal of the current source is coupled to the input voltage. A second terminal of the current source is connected to the first terminal of the first transistor.

In certain embodiments, the power saving system further includes a third transistor and an input resistor. A first terminal of the third transistor and a first terminal of the input resistor are connected to a cathode of a first diode and a cathode of a second diode. An anode of the first diode is connected to the battery. An anode of the second diode is connected to the external power circuit. A second terminal of the input resistor is connected to a control terminal of the third transistor. A second terminal of the third transistor is connected to the current source. A voltage of a second terminal of the third transistor is the input voltage.

In certain embodiments, the power saving system further includes a fourth transistor and a fifth transistor. A first terminal of the fourth transistor is connected to a second terminal of the input resistor and a control terminal of the fourth transistor. A second terminal of the fourth transistor is connected to a first terminal of the fifth transistor and a control terminal of the fifth transistor. A second terminal of the fifth transistor is grounded.

In certain embodiments, the power saving system further includes a first inverter. An input terminal of the first inverter is connected to the first terminal of the first transistor. An output terminal of the first inverter is connected to the trigger terminal of the counter. A positive power terminal of the first inverter is connected to the second terminal of the third transistor. A negative power terminal of the first inverter is grounded.

In certain embodiments, the power saving system further includes a voltage detector circuit. The voltage detector circuit is connected to the second terminal of the third transistor. The voltage detector circuit is configured to detect the voltage of the second terminal of the third transistor and determine whether or not the voltage of the second terminal of the third transistor is higher than a voltage threshold to output a voltage detected signal.

In certain embodiments, the power saving system further includes a first edge triggering circuit. A power terminal of the first edge triggering circuit is connected to the second terminal of the third transistor. An input terminal of the first edge triggering circuit is connected to an output terminal of the voltage detector circuit. The first edge triggering circuit determines a level of a first triggering signal according to the voltage detected signal and outputs the first triggering signal.

In certain embodiments, the power saving system further includes a first flip-flop. A power terminal of the first flip-flop is connected to the second terminal of the third transistor. A first input terminal of the first flip-flop is connected to an output terminal of the first edge triggering circuit. An output terminal of the first flip-flop is connected to an enable terminal of the counter.

In certain embodiments, the power saving system further includes a first OR gate and a second inverter. An input terminal of the second inverter is connected to the output terminal of the voltage detector circuit and receives the voltage detected signal from the output terminal of the voltage detector circuit. An output terminal of the second inverter is connected to a first input terminal of the first OR gate. A second input terminal of the first OR gate is connected to an output terminal of the counter. An output terminal of the first OR gate is connected to a second input terminal of the first flip-flop.

In certain embodiments, the power saving system further includes a second OR gate. A first input terminal of the second OR gate is connected to the output terminal of the counter. A second input terminal of the second OR gate is connected to an output terminal of a control circuit. An output terminal of the second OR gate is connected to the second input terminal of the first OR gate. The control circuit determines whether or not the battery is switched from the normal operation mode to the power saving mode to output a control signal to the second input terminal of the second OR gate.

In certain embodiments, the power saving system further includes a storage circuit. An input terminal of the storage circuit is connected to the output terminal of the control circuit. An output terminal of the storage circuit is connected to the second input terminal of the second OR gate.

In certain embodiments, the power saving system further includes a third OR gate and a second flip-flop. A first input terminal of the third OR gate is connected to the output terminal of the second OR gate. A second input terminal of the third OR gate is connected to an output terminal of the second inverter. An output terminal of the third OR gate is connected to a first input terminal of the second flip-flop. A power terminal of the second flip-flop is connected to the second terminal of the third transistor. An output terminal of the second flip-flop is connected to an input terminal of the operation management circuit.

In certain embodiments, the power saving system further includes an AND gate and a fourth OR gate. A first input terminal of the AND gate is connected to the output terminal of the voltage detector circuit and receives the voltage detected signal from the output terminal of the voltage detector circuit. A second input terminal of the AND gate is connected to the output terminal of the first inverter. A first input terminal of the fourth OR gate is connected to the output terminal of the first edge triggering circuit. A second input terminal of the fourth OR gate is connected to an output terminal of the AND gate. An output terminal of the fourth OR gate is connected to a second input terminal of the second flip-flop.

In certain embodiments, the power saving system further includes a second edge trigger circuit. A power terminal of the second edge trigger circuit is connected to the second terminal of the third transistor. An input terminal of the second edge trigger circuit is connected to an output terminal of the first inverter. An output terminal of the second edge trigger circuit is connected to the second input terminal of the AND gate.

As described above, the present disclosure provides the power saving system of the battery charger. In a shipping mode or other power saving modes, the power saving system of the present disclosure automatically turns off the electronic components (such as power converters) in the electronic device and the battery stops supplying the power to the electronic components, thereby saving the power of the battery. When the power saving system of the present disclosure receives the wake-up signal from the external power circuit, the power saving system of the present disclosure determines whether or not the working period of the wake-up signal is larger than the time threshold, and accordingly determines whether or not the battery is to remain in the power saving mode or to enter the normal operation mode.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
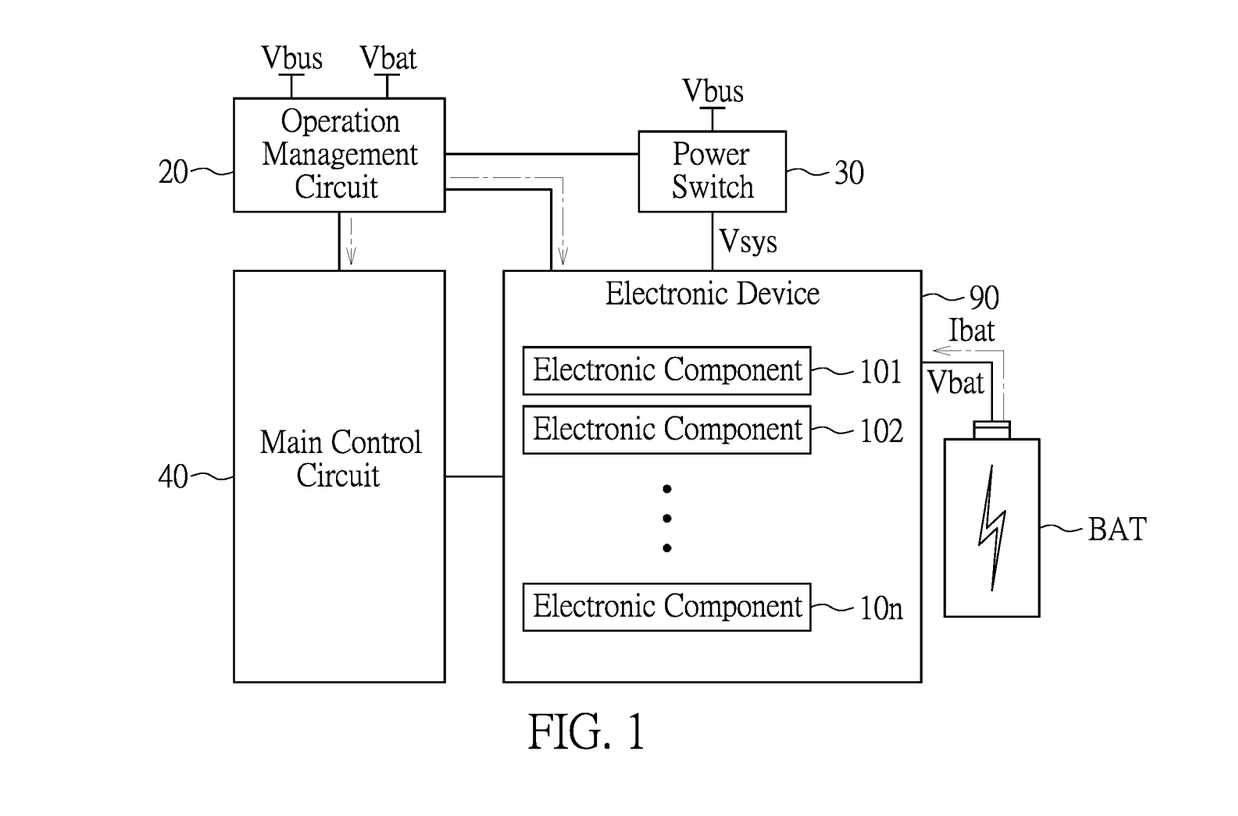
FIG. 1 is a circuit diagram of an operation management circuit of a power saving system of a battery charger, an electronic device and a battery according to an embodiment of the present disclosure.
Figure 2:
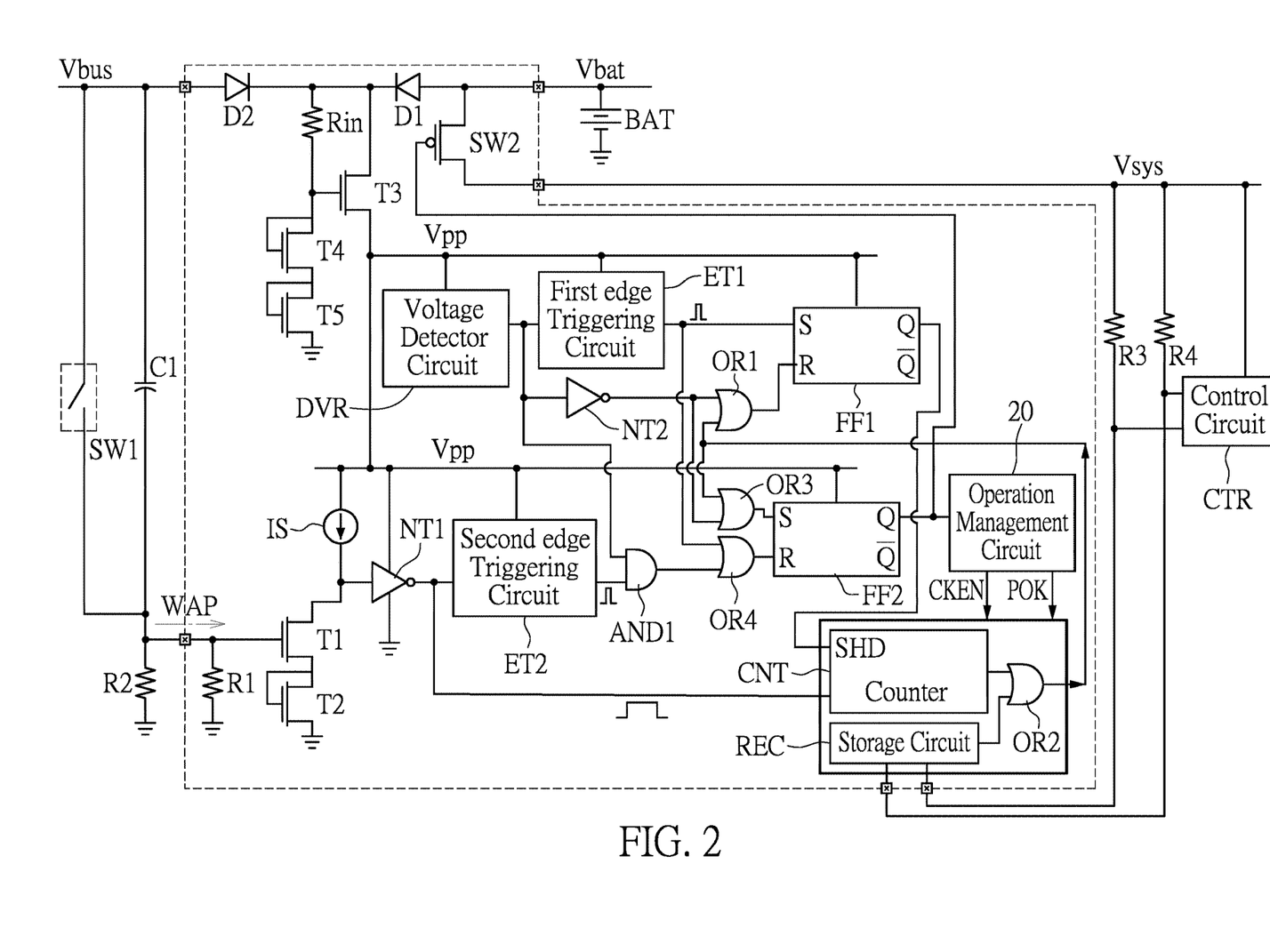
FIG. 2 is a circuit diagram of the power saving system of the battery charger according to the embodiment of the present disclosure.

Reference is made to FIGS. 1 and 2, in which FIG. 1 is a circuit diagram of an operation management circuit of a power saving system of a battery charger, an electronic device and a battery according to an embodiment of the present disclosure, and FIG. 2 is a circuit diagram of the power saving system of the battery charger according to the embodiment of the present disclosure.

An operation management circuit 20 of the battery charger of the embodiment of the present disclosure may directly control or indicate a main control circuit 40 to control an operational state of an electronic device 90. The electronic device 90 may include a plurality of electronic components 101 to 10n such as power convertors, low dropout voltage regulators, analog-to-digital converters, and so on.

For example, when the electronic device 90 is transported (by ship), the operation management circuit 20 can turn off the electronic components 101 to 10n of the electronic device 90. At this time, a battery BAT does not supply power to the electronic device 90, thereby saving the power of the battery BAT. In addition, the operation management circuit 20 can control an operational state of a power switch 30 to control an external power circuit to continually supply or stop supplying a power voltage Vbus to the electronic device 90.

It is worth noting that, the power saving system of the battery charger of the embodiment may include a first transistor T1, a second transistor T2, a counter CNT and the operation management circuit 20.

A first terminal of the first transistor T1 is connected to a second terminal of a current source IS. A first terminal of the current source IS is coupled to an input voltage Vpp. The input voltage Vpp may be a battery voltage Vbat or the power voltage Vbus. A first terminal of the second transistor T2 and a control terminal of the second transistor T2 may be connected to a second terminal of the first transistor T1. A second terminal of the second transistor T2 may be grounded.

A control terminal of the first transistor T1 may be directly connected to the external power circuit. Alternatively, the control terminal of the first transistor T1 may be connected to the external power circuit through a first switch SW1 or a first capacitor C1. The external power circuit may be any suitable circuit that is capable of waking up some of the circuit components included in the power saving system of the battery charger of the embodiment to operate. The control terminal of the first transistor T1 may receive the power voltage Vbus and a wake-up signal WAP from the external power circuit.

The first terminal of the first transistor T1 may be directly connected to a trigger terminal of the counter CNT. Alternatively, as shown in FIG. 2, a first inverter NT1 may be disposed between the first terminal of the first transistor T1 and the trigger terminal of the counter CNT. The first terminal of the first transistor T1 may be connected to an input terminal of the first inverter NT1. An output terminal of the first inverter NT1 may be connected to the trigger terminal of the counter CNT. A positive power terminal of the first inverter NT1 may be coupled to the input voltage Vpp. A negative power terminal of the first inverter NT1 may be grounded.

The wake-up signal WAP is processed by the first transistor T1 (and inverted by the first inverter NT1), and then outputted to the counter CNT. When the counter CNT is woken up by the wake-up signal WAP from the external power circuit in a power saving mode (e.g., in a shipping mode), the counter CNT determines whether or not a working period of the wake-up signal WAP is larger than a time threshold to output a counting signal.

For example, when the counter CNT determines that the working period of the wake-up signal WAP is not larger than the time threshold, the counter CNT outputs the counting signal at a first logic level (such as "1"). Conversely, when the counter CNT determines that the working period of the wake-up signal WAP is larger than the time threshold, the counter CNT outputs the counting signal at a second logic level (such as "0"). The operation management circuit 20 may be directly connected to the counter CNT, or may be connected to the counter CNT through some circuit components as shown in FIG. 2. When the operation management circuit 20 receives the counting signal indicating that the working period of the wake-up signal WAP is not larger than the time threshold (such as 500 us) in the power saving mode, the operation management circuit 20 may turn off the counter CNT and stop supplying power to the counter CNT, and turn off the electronic components 101 to 10n included in the electronic device 90. At this time, the battery 90 may stop supplying power to the electronic device 90, thereby saving the power of the battery BAT.

Conversely, when the operation management circuit 20 receives the counting signal indicating that the working period of the wake-up signal WAP is larger than the time threshold in the power saving mode, the operation management circuit 20 switches the electronic device from the power saving mode to a normal operation mode. Therefore, the operation management circuit 20 may output a first clock enable signal to each of the electronic components 101 to 10n included in the electronic device 90 to trigger the electronic components 101 to 10n to be turned on and to operate. In addition, the operation management circuit 20 may output a second clock enable signal to the counter CNT to trigger the counter CNT to be turned off At this time, the battery BAT may supply power to the electronic components 101 to 10n included in the electronic device 90 for operation.

If necessary, the power saving system of the battery charger of the embodiment may include one or more of: a first resistor R1, a second resistor R2, a first diode D1, a second diode D2, a third transistor T3 and an input resistor Rin.

A first terminal of the first resistor R1 and a first terminal of the second resistor R2 may be connected to a control terminal of the first transistor T1. A second terminal of the first resistor R1 and a second terminal of the second resistor R2 may be grounded.

An anode of the first diode D1 may be connected to the battery BAT. An anode of the second diode D2 may be connected to the external power circuit. A first terminal of the input resistor Rin may be connected to a cathode of the first diode D1 and a cathode of the second diode D2. A second terminal of the input resistor Rin may be connected to a control terminal of the third transistor T3.

The cathode of the first diode D1 and the cathode of the second diode D2 may be connected to a first terminal of the third transistor T3. A voltage of the first terminal of the third transistor T3 is a highest one of the battery voltage Vbat and the power voltage Vbus.

A voltage of a second terminal of the third transistor T3 may be the input voltage Vpp as described above. That is, the first terminal of the current source IS and the positive power terminal of the first inverter NT1 may be connected to the second terminal of the third transistor T3, and obtain the input voltage Vpp from the second terminal of the third transistor T3 for operation.

If necessary, the power saving system of the battery charger of the embodiment may include one or both of a fourth transistor T4 and a fifth transistor T5.

A first terminal of the fourth transistor T4 may be connected to the second terminal of the input resistor Rin and a control terminal of the fourth transistor T4. A second terminal of the fourth transistor T4 may be connected to a first terminal of the fifth transistor T5 and a control terminal of the fifth transistor T5. A second terminal of the fifth transistor T5 may be grounded.

If necessary, the power saving system of the battery charger of the embodiment may include one or more of: a voltage detector circuit DVR, a first edge triggering circuit ET1, a first flip-flop FF1, a first OR gate OR1, a second inverter NT2, a control circuit CTR, a second OR gate OR2, a storage circuit REC, a third OR gate OR3, a second flip-flop FF2, an AND gate AND1, a fourth OR gate OR4 and a second edge triggering circuit ET2.

It should be understood that, the power saving system of the battery charger of the embodiment may include all of the circuit components as shown in FIG. 2, but the present disclosure is not limited thereto. In practice, some of the circuit components shown in FIG. 2 may be absent from the power saving system of the battery charger of the present disclosure.

As shown in FIG. 2, a power terminal of the voltage detector circuit DVR, a power terminal of the first edge triggering circuit ET1 and a power terminal of the first flip-flop FF1 may be connected to the second terminal of the third transistor T3, and receive the input voltage VPP from the second terminal of the third transistor T3 for operation.

The voltage detector circuit DVR may detect the input voltage VPP of the second terminal of the third transistor T3 and determine whether or not the input voltage VPP is higher than a voltage threshold to output a voltage detected signal.

An input terminal of the first edge triggering circuit ET1 may be connected to an output terminal of the voltage detector circuit DVR. The first edge triggering circuit ET1 may determine a level of a first triggering signal according to the voltage detected signal, and output the first triggering signal.

For example, when the first edge triggering circuit ET1 determines that the input voltage VPP is higher than the voltage threshold according to the voltage detected signal, the first edge triggering circuit ET1 outputs the first triggering signal at a high level. For example, the first edge triggering circuit ET1 outputs the first triggering signal having a pulse wave. Conversely, when the first edge triggering circuit ET1 determines that the input voltage VPP is not higher than the voltage threshold according to the voltage detected signal, the first edge triggering circuit ET1 outputs the first triggering signal at a low level.

In addition, the output terminal of the voltage detector circuit DVR may be connected to an input terminal of the second inverter NT2, and output the voltage detected signal to the input terminal of the second inverter NT2. An output terminal of the second inverter NT2 may be connected to a first input terminal of the first OR gate OR1. A second input terminal of the first OR gate OR1 may be directly connected to an output terminal of the counter CNT, or connected to an output terminal of the second OR gate OR2. An output terminal of the first OR gate OR1 may be connected to a second input terminal R of the first flip-flop FF1.

If the second OR gate OR2 is disposed, a first input terminal of the second OR gate OR2 may be connected to the output terminal of the counter CNT, and a second input terminal of the second OR gate OR2 may be directly connected to an output terminal of the control circuit CTR. Alternatively, as shown in FIG. 2, the storage circuit REC, such as a register, is connected between the second input terminal of the second OR gate OR2 and the output terminal of the control circuit CTR. An input terminal of the storage circuit REC may be connected to the output terminal of the control circuit CTR. An output terminal of the storage circuit REC may be connected to the second input terminal of the second OR gate OR2. The storage circuit REC may be used to store a control signal outputted by the control circuit CTR.

A first input terminal S of the first flip-flop FF1 may be connected to an output terminal of the first edge triggering circuit ET1. An output terminal Q of the first flip-flop FF1 may be connected to an enable terminal SHD of the counter CNT.

In the embodiment, the first flip-flop FF1 may be an SR flip-flop, but the present disclosure is not limited thereto. In practice, the first flip-flop FF1 may be replaced with other types of flip-flops.

The first flip-flop FF1 may determine a level of a first logic signal according to the first triggering signal from the first edge triggering circuit ET1 and a signal outputted by the first OR gate OR1 as described in the following. The first flip-flop FF1 may output the first logic signal to the enable terminal SHD of the counter CNT. The counter CNT is enabled to operate or stop operating by the first logic signal.

A first input terminal of the third OR gate OR3 may be connected to the output terminal of the second OR gate OR2. A second input terminal of the third OR gate OR3 may be connected to the output terminal of the second inverter NT2. An output terminal of the third OR gate OR3 may be connected to a first input terminal S of the second flip-flop FF2. A power terminal of the second flip-flop FF2 may be connected to the second terminal of the third transistor T3 and receive the voltage of the second terminal of the third transistor T3.

A first input terminal of the AND gate AND1 may be connected to the output terminal of the voltage detector circuit DVR and receive the voltage detected signal from the voltage detector circuit DVR. A second input terminal of the AND gate AND1 may be connected to an output terminal of the second edge triggering circuit ET2.

An input terminal of the second edge triggering circuit ET2 may be connected to the output terminal of the first inverter NT1. A power terminal of the second edge triggering circuit ET2 may be connected to the second terminal of the third transistor T3 and receive the input voltage Vpp from the second terminal of the third transistor T3.

An output terminal of the AND gate AND1 may be connected to a second input terminal of the fourth OR gate OR4. A first input terminal of the fourth OR gate OR4 may be connected to the output terminal of the first edge triggering circuit ET1. An output terminal of the fourth OR gate OR4 may be connected to a second input terminal R of the second flip-flop FF2. An output terminal Q of the second flip-flop FF2 may be connected to an enable terminal of the operation management circuit 20. An output terminal of the operation management circuit 20 may be connected to an input terminal of the counter CNT.

If necessary, a first terminal of a second switch SW2 (such as a sixth transistor) may be connected to the battery BAT.

A second terminal of the second switch SW2 may be connected to a first terminal of a third resistor R3 and a first terminal of a fourth resistor R4. A control terminal of the second switch SW2 may be connected to an output terminal Q of the second flip-flop FF2. A second terminal of the third resistor R3 may be connected to a first input terminal of the storage circuit REC. A second terminal of the fourth resistor R4 may be connected to a second input terminal of the storage circuit REC.

Figure 3:
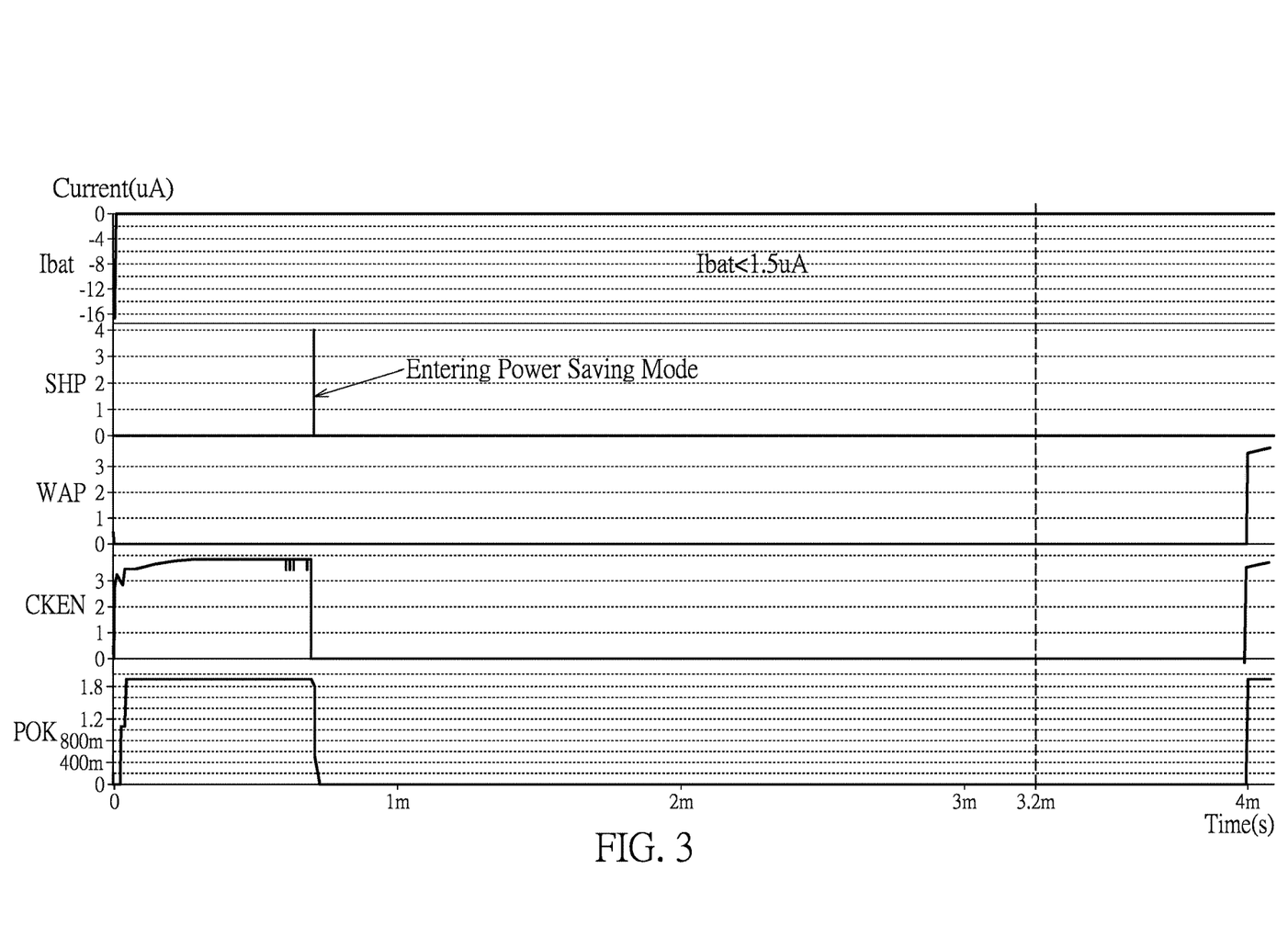
FIG. 3 is a waveform diagram of signals of the power saving system of the battery charger according to the embodiment of the present disclosure.
Figure 4:
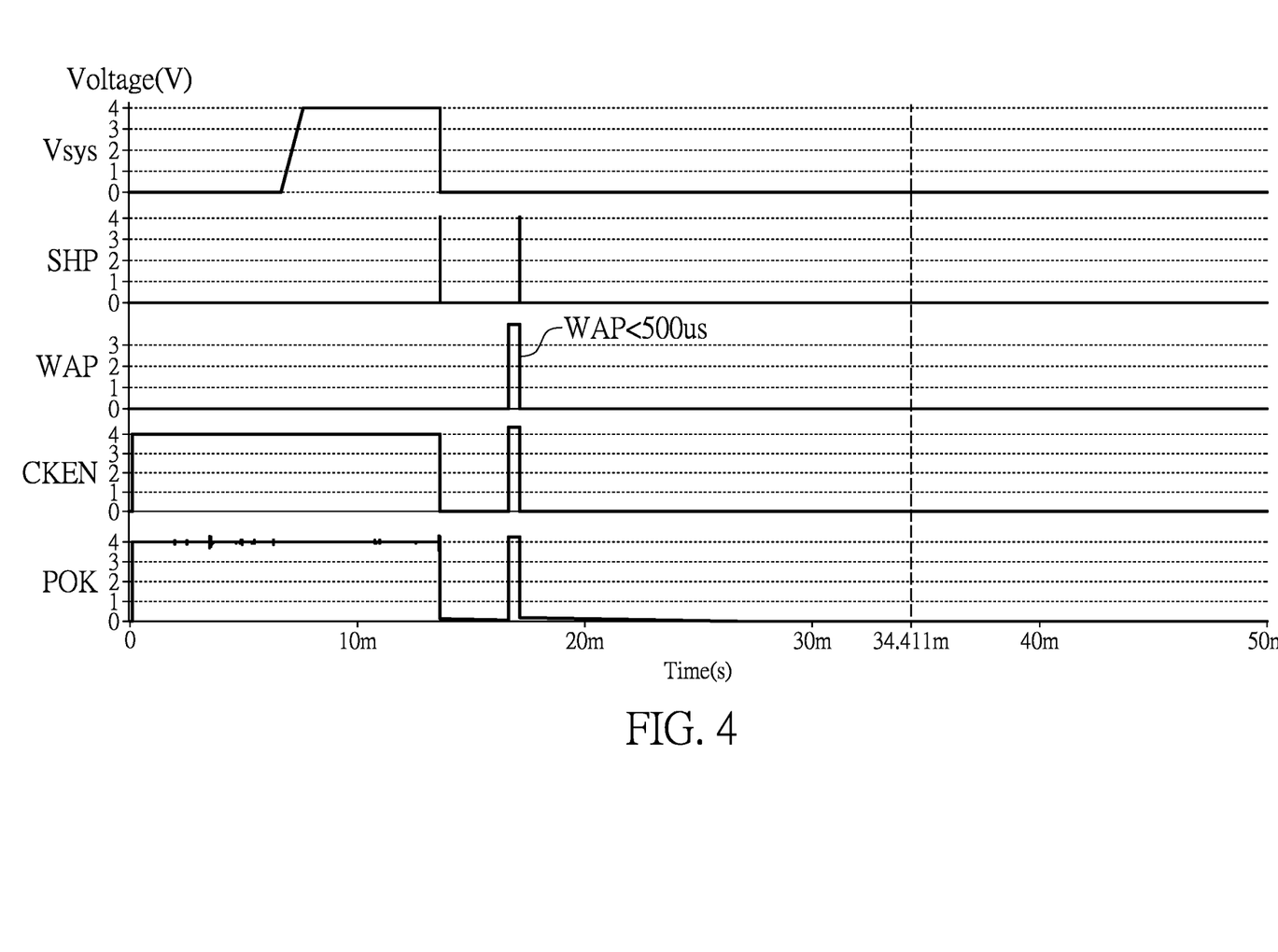
FIG. 4 is a waveform diagram of signals of the power saving system of the battery charger according to the embodiment of the present disclosure.

Reference is made to FIG. 1 to FIG. 4, in which FIGS. 3 and 4 are waveform diagrams of signals of the power saving system of the battery charger according to the embodiment of the present disclosure.

First, when the power saving system of the battery charger is powered on, the power saving system enters the normal operation mode. In the normal operation mode, the external power circuit may be connected to the anode of the second diode D2 and supply the power voltage Vbus to the anode of the second diode D2. The power voltage Vbus is processed by the third transistor T3 to form the input voltage Vpp. The input voltage Vpp may be supplied to the voltage detector circuit DVR, the first edge triggering circuit ET1, the first flip-flop FF1, the second edge triggering circuit ET2 and the second flip-flop FF2 for operation.

When the external power circuit starts supplying the input voltage Vpp, the voltage detector circuit DVR outputs the voltage detected signal to the first edge triggering circuit ET1. The first edge triggering circuit ET1 outputs the first triggering signal to the first flip-flop FF1 according to the voltage detected signal. The first flip-flop FF1 triggers the counter CNT to be turned off according to the first triggering signal. When the counter CNT is turned off, the counter CNT does not detect the working period of the wake-up signal WAP thus completing power-on procedures under normal circumstances.

After the power saving system of the battery charger is powered on for a period of time, the control circuit CTR may determine whether or not the battery BAT is to be switched from the normal operation mode to the power saving mode. When the control circuit CTR switches the battery BAT from the normal operation mode to the power saving mode according to power saving requirements of the power saving system, the control circuit CTR outputs the control signal at a high level to the storage circuit REC. The storage circuit REC stores the control signal. The storage circuit REC outputs the stored control signal to the second input terminal of the second OR gate OR2. The first OR gate OR1 resets the first flip-flop FF1 such that the first flip-flop FF1 outputs a first flip-flop signal at a low level according to a logic signal from the second OR gate OR2. The counter CNT is set to detect and count the working period of the wake-up signal WAP according to the first flip-flop signal at the low level. The third OR gate OR3 triggers the second flip-flop FF2 to output a second flip-flop signal at a high level according to the logic signal from the second OR gate OR2. The operation management circuit 20 outputs a clock enable signal CKEN at a low level and a power ready signal POK at a low level according to the second flip-flop signal at the high level. The operation management circuit 20 turns off the electronic device 90. Then, the operation management circuit 20 is turned off. At this time, the battery BAT enters the power saving mode as shown in FIG. 3. In the power saving mode, the power of the battery BAT can be saved. A current of the battery BAT is smaller than 1.5 uA.

In the power saving mode, the control terminal of the first transistor T1 is connected to the external power circuit. When the control terminal of the first transistor T1 receives the wake-up signal WAP from the external power circuit, a detection operation starts being performed on the wake-up signal WAP. The wake-up signal WAP is processed by the first transistor T1 and then outputted to the first inverter NT1. Then, the wake-up signal WAP is inverted by the first inverter NT and then outputted to the second edge triggering circuit ET2. The second edge triggering circuit ET2 may output a second triggering signal to the second input terminal of the AND gate AND1 according to the wake-up signal WAP from the first inverter NT. The fourth OR gate OR4 outputs a logic signal to the second flip-flop FF2 according to a logic signal outputted by the AND gate AND1. The second flip-flop FF2 is reset and then outputs the second flip-flop signal at a low level according to the logic signal from the fourth OR gate OR4. The operation management circuit 20 and the electronic device 90 are activated, and the operation management circuit 20 outputs the clock enable signal CKEN at a high level and the power ready signal POK at a high level, according to the second flip-flop signal at the low level. As a result, the counter CNT starts to count the working period of the pulse wave of the wake-up signal WAP and to determine whether or not the working period of the pulse wave of the wake-up signal WAP is larger than the time threshold as shown in FIG. 3.

In the detection operation of the power saving mode, the working period of the pulse wave of the wake-up signal WAP received by the counter CNT from the first inverter NT1 is shown in FIGS. 3 and 4. When the working period of the wake-up signal WAP is not larger than the time threshold, the counter CNT may output a counting signal SHP at a high level. The third OR gate OR3 triggers the second flip-flop FF2 to output the second flip-flop signal at a high level to the operation management circuit 20 according to the logic signal from the second OR gate OR2. The operation management circuit 20 outputs the clock enable signal CKEN at the low level and the power ready signal POK at the low level to the counter CNT (and each of the electronic components 101 to 10n of the electronic device 90), according to the second flip-flop signal at the high level from the second flip-flop FF2. Then, the operation management circuit 20 is turned off. As a result, the counter CNT and the electronic components 101 to 10n of the electronic device 90 are turned off for a period of time. At this time, the power is not supplied from the battery BAT to the counter CNT and the electronic device 90, thereby saving the power of the battery BAT.

When the control terminal of the first transistor T1 receives the wake-up signal WAP at the high level again, the detection operation is performed on the wake-up signal WAP again. As described above, in the detection operation, the operation management circuit 20 determines whether or not the working period of the wake-up signal WAP that is inverted by the first inverter NT1 is larger than the time threshold, and accordingly determines the levels of the clock enable signal CKEN and the power ready signal POK outputted to the counter CNT (as well as each of the electronic components 101 to 10n of the electronic device 90).

Figure 5:
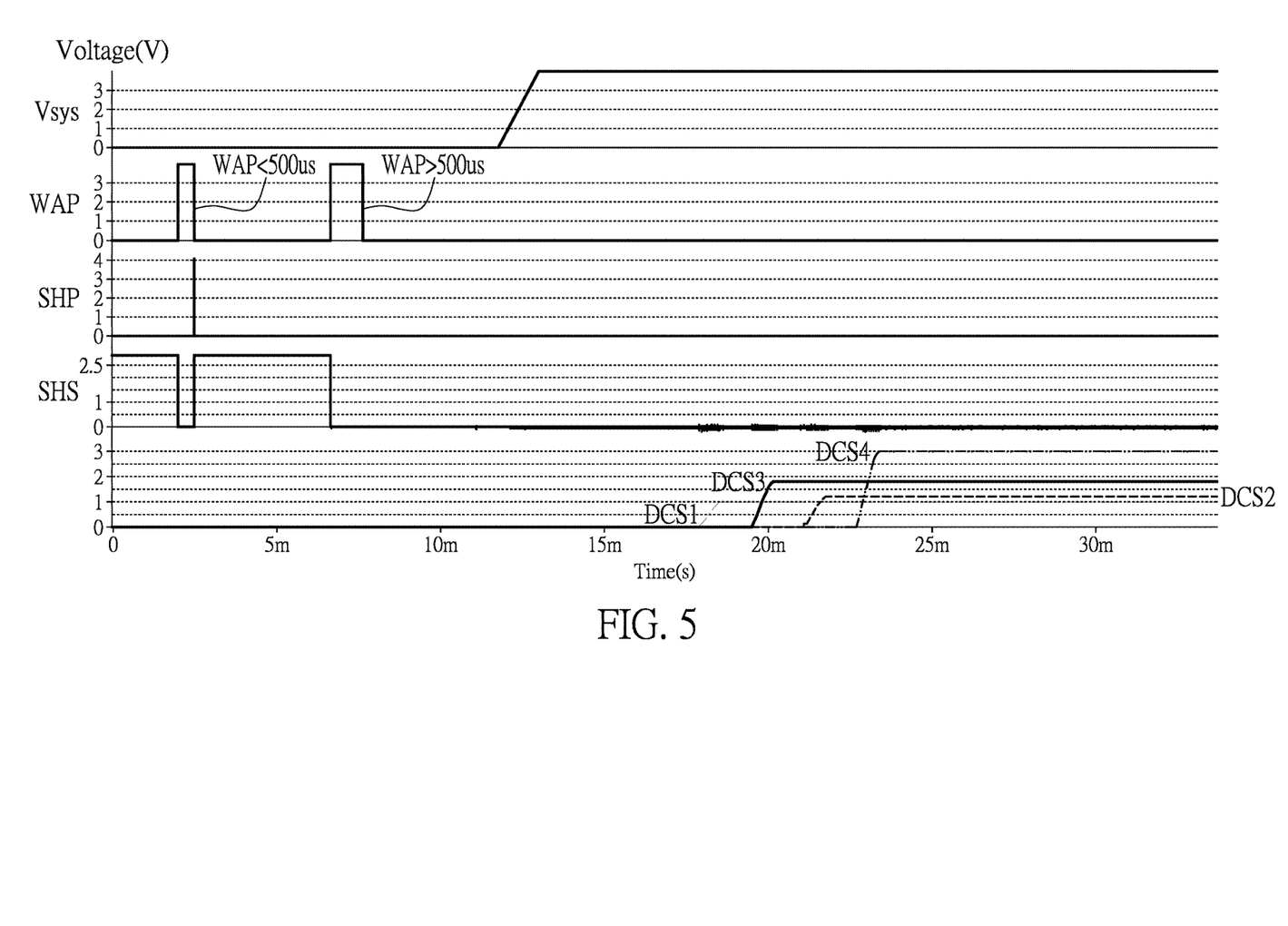
FIG. 5 is a waveform diagram of signals of the power saving system of the battery charger according to the embodiment of the present disclosure.

Reference is made to FIGS. 1, 2 and 5, in which FIG. 2 is a circuit diagram of the power saving system of the battery charger according to the embodiment of the present disclosure, and FIG. 5 is a waveform diagram of signals of the power saving system of the battery charger according to the embodiment of the present disclosure.

The counter CNT counts the wake-up signal WAP from the first inverter NT1. When a working period of a first one of the pulse waves of the wake-up signal WAP counted by the counter CNT is not larger than the time threshold as shown in FIG. 5, the counter CNT may output the counting signal SHP at the high level. Then, the second flip-flop FF2 outputs a second flip-flop signal SHS to the operation management circuit 20. The operation management circuit 20 turns off the counter CNT (as well as each of the electronic components 101 to 10n of the electronic device 90) according to the second flip-flop signal SHS.

Then, when a working period of a second one of the pulse waves of the wake-up signal WAP counted by the counter CNT is larger than the time threshold as shown in FIG. 5, the counter CNT may output the counting signal SHP at a low level. As a result, the battery BAT is switched from the power saving mode to the normal operation mode.

In the normal operation mode, the battery BAT may supply power to the electronic components 101 to 10n included in the electronic device 90. At this time, in the electronic device 90, the electronic components 101 to 10n such as power converters may perform voltage converting operations to respectively output converted voltages DCS1 to DCS4. The counter CNT stops counting.

In summary, the present disclosure provides the power saving system of the battery charger. In the shipping mode or other power saving modes, the power saving system of the present disclosure automatically turns off the electronic components (such as the power converters) included in the electronic device and the battery stops supplying the power to the electronic components, thereby saving the power of the battery. When the power saving system of the present disclosure receives the wake-up signal from the external power circuit, the power saving system of the present disclosure determines whether or not the working period of the wake-up signal is larger than the time threshold and accordingly determines whether or not the battery is to remain in the power saving mode or to enter the normal operation mode.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power saving system of a battery charger, comprising:
   a first transistor, wherein a control terminal of the first transistor is connected to an external power circuit and receives a wake-up signal from the external power circuit, and a first terminal of the first transistor is coupled to an input voltage;
   a second transistor, wherein a first terminal and a control terminal of the second transistor are connected to a second terminal of the first transistor, and a second terminal of the second transistor is grounded;
   a counter, wherein a trigger terminal of the counter is connected to the first terminal of the first transistor, and when the counter receives the wake-up signal and is woken up by the wake-up signal in a power saving mode, the counter determines whether or not a working period of the wake-up signal is larger than a time threshold to output a counting signal; and
   an operation management circuit connected to the counter and an electronic device, wherein the electronic device is coupled to a battery, and the operation management circuit is configured to receive the counting signal from the counter;
   wherein, when the counting signal received by the operation management circuit in the power saving mode indicates that the working period of the wake-up signal is not larger than the time threshold, the operation management circuit turns off the counter and a plurality of electronic components included in the electronic device;
   wherein, when the counting signal received by the operation management circuit in the power saving mode indicates that the working period of the wake-up signal is larger than the time threshold, the operation management circuit determines whether or not the battery is switched from the power saving mode to a normal operation mode, and triggers the electronic device to be turned on and to receive power from the external power circuit or the battery.

2. The power saving system according to claim 1, further comprising:
   a first resistor, wherein a first terminal of the first resistor is connected to the control terminal of the first transistor, and a second terminal of the first resistor is grounded.

3. The power saving system according to claim 1, further comprising:
   a current source, wherein a first terminal of the current source is coupled to the input voltage, and a second terminal of the current source is connected to the first terminal of the first transistor.

4. The power saving system according to claim 3, further comprising:
   a third transistor and an input resistor, wherein a first terminal of the third transistor and a first terminal of the input resistor are connected to a cathode of a first diode and a cathode of a second diode, an anode of the first diode is connected to the battery, an anode of the second diode is connected to the external power circuit, a second terminal of the input resistor is connected to a control terminal of the third transistor, a second terminal of the third transistor is connected to the current source, and a voltage of a second terminal of the third transistor is the input voltage.

5. The power saving system according to claim 4, further comprising:
   a fourth transistor and a fifth transistor, wherein a first terminal of the fourth transistor is connected to a second terminal of the input resistor and a control terminal of the fourth transistor, a second terminal of the fourth transistor is connected to a first terminal of the fifth transistor and a control terminal of the fifth transistor, and a second terminal of the fifth transistor is grounded.

6. The power saving system according to claim 4, further comprising:
   a first inverter, wherein an input terminal of the first inverter is connected to the first terminal of the first transistor, an output terminal of the first inverter is connected to the trigger terminal of the counter, a positive power terminal of the first inverter is connected to the second terminal of the third transistor, and a negative power terminal of the first inverter is grounded.

7. The power saving system according to claim 6, further comprising:
a voltage detector circuit connected to the second terminal of the third transistor and configured to detect the voltage of the second terminal of the third transistor and determine whether or not the voltage of the second terminal of the third transistor is higher than a voltage threshold, and output a voltage detected signal.

8. The power saving system according to claim 7, further comprising:
a first edge triggering circuit, wherein a power terminal of the first edge triggering circuit is connected to the second terminal of the third transistor, an input terminal of the first edge triggering circuit is connected to an output terminal of the voltage detector circuit, and the first edge triggering circuit determines a level of a first triggering signal according to the voltage detected signal and outputs the first triggering signal.

9. The power saving system according to claim 8, further comprising:
a first flip-flop, wherein a power terminal of the first flip-flop is connected to the second terminal of the third transistor, a first input terminal of the first flip-flop is connected to an output terminal of the first edge triggering circuit, and an output terminal of the first flip-flop is connected to an enable terminal of the counter.

10. The power saving system according to claim 9, further comprising:
a first OR gate and a second inverter, wherein an input terminal of the second inverter is connected to the output terminal of the voltage detector circuit and receives the voltage detected signal from the output terminal of the voltage detector circuit, an output terminal of the second inverter is connected to a first input terminal of the first OR gate, a second input terminal of the first OR gate is connected to an output terminal of the counter, and an output terminal of the first OR gate is connected to a second input terminal of the first flip-flop.

11. The power saving system according to claim 10, further comprising:
a second OR gate, wherein a first input terminal of the second OR gate is connected to the output terminal of the counter, a second input terminal of the second OR gate is connected to an output terminal of a control circuit, an output terminal of the second OR gate is connected to the second input terminal of the first OR gate, and the control circuit determines whether or not the battery is switched from the normal operation mode to the power saving mode to output a control signal to the second input terminal of the second OR gate.

12. The power saving system according to claim 11, further comprising:
a storage circuit, wherein an input terminal of the storage circuit is connected to the output terminal of the control circuit, and an output terminal of the storage circuit is connected to the second input terminal of the second OR gate.

13. The power saving system according to claim 12, further comprising:
a third OR gate and a second flip-flop, wherein a first input terminal of the third OR gate is connected to the output terminal of the second OR gate, a second input terminal of the third OR gate is connected to an output terminal of the second inverter, an output terminal of the third OR gate is connected to a first input terminal of the second flip-flop, a power terminal of the second flip-flop is connected to the second terminal of the third transistor, and an output terminal of the second flip-flop is connected to an input terminal of the operation management circuit.

14. The power saving system according to claim 13, further comprising:
an AND gate and a fourth OR gate, wherein a first input terminal of the AND gate is connected to the output terminal of the voltage detector circuit and receives the voltage detected signal from the output terminal of the voltage detector circuit, a second input terminal of the AND gate is connected to the output terminal of the first inverter, a first input terminal of the fourth OR gate is connected to the output terminal of the first edge triggering circuit, a second input terminal of the fourth OR gate is connected to an output terminal of the AND gate, and an output terminal of the fourth OR gate is connected to a second input terminal of the second flip-flop.

15. The power saving system according to claim 14, further comprising:
a second edge trigger circuit, wherein a power terminal of the second edge trigger circuit is connected to the second terminal of the third transistor, an input terminal of the second edge trigger circuit is connected to the output terminal of the first inverter, and an output terminal of the second edge trigger circuit is connected to the second input terminal of the AND gate.

* * * * *